United States Patent
Singhal et al.

(10) Patent No.: US 10,387,378 B2
(45) Date of Patent: Aug. 20, 2019

(54) STORAGE AND RETRIEVAL OF FILE-LEVEL CHANGES ON DEDUPLICATION BACKUP SERVER

(71) Applicant: Druva Technologies Pte. Ltd., Singapore (SG)

(72) Inventors: Nikhil Singhal, Pune (IN); Milind Borate, Pune (IN); Shekhar S. Deshkar, Pune (IN)

(73) Assignee: DRUVA TECHNOLOGIES PTE. LTD., Singapore (SG)

( * ) Notice: Subject to any disclaimer, the term of this patent is extended or adjusted under 35 U.S.C. 154(b) by 922 days.

(21) Appl. No.: 14/791,038

(22) Filed: Jul. 2, 2015

(65) Prior Publication Data

US 2016/0004717 A1    Jan. 7, 2016

(30) Foreign Application Priority Data

Jul. 4, 2014 (IN) .......................... 3324/CHE/2014

(51) Int. Cl.
*G06F 16/174* (2019.01)
*G06F 11/14* (2006.01)
*G06F 16/22* (2019.01)
*H04L 29/08* (2006.01)

(52) U.S. Cl.
CPC ...... *G06F 16/1748* (2019.01); *G06F 11/1402* (2013.01); *G06F 11/1453* (2013.01); *G06F 16/2228* (2019.01); *H04L 67/06* (2013.01); *H04L 67/1097* (2013.01); *H04L 67/303* (2013.01); *G06F 2201/83* (2013.01)

(58) Field of Classification Search
CPC ........... G06F 17/30156; G06F 11/1402; G06F 16/1748; G06F 16/2228
See application file for complete search history.

(56) References Cited

U.S. PATENT DOCUMENTS

| | | | |
|---|---|---|---|
| 2005/0086241 A1* | 4/2005 | Ram | G06F 11/1453 |
| 2010/0211885 A1* | 8/2010 | Berg | G06F 17/243 |
| | | | 715/745 |
| 2011/0225129 A1* | 9/2011 | Agrawal | G06F 17/30156 |
| | | | 707/692 |
| 2012/0185759 A1* | 7/2012 | Balinsky | G06F 21/6227 |
| | | | 715/209 |
| 2013/0145447 A1* | 6/2013 | Maron | G06F 21/31 |
| | | | 726/6 |

* cited by examiner

*Primary Examiner* — Jensen Hu
(74) *Attorney, Agent, or Firm* — Fenwick & West LLP

(57) ABSTRACT

When a backup client sends a request to back up a file to a backup server, the file and an index (e.g., checksum, hash, encryption, etc.) of the file are stored on the backup server in an efficient deduplication storage. If a backup client sends a request to back up a modified version of a file already stored on a backup server, the modified portion of the file is stored. In addition, an index of the modified portion is generated and stored along with the modified portions on the backup server. The indices can be used to reconstruct the file or modified version of the file when retrieved. The efficient deduplication storage method ensures that multiple copies of files or portions of files do not exist on the servers.

20 Claims, 5 Drawing Sheets

STORAGE AND RETRIEVAL OF FILE-LEVEL CHANGES ON DEDUPLICATION BACKUP SERVER

CROSS REFERENCE

This application claims a benefit of, and priority to, India Patent Application No. 3324/CHE/2014, filed Jul. 4, 2014, the contents of which is incorporated by reference in its entirety.

BACKGROUND

1. Field of Art

The disclosure generally relates to the field of systems for backing up and retrieving data and file-level changes of data and, in particular, to efficient indexing and storing when backing up data and file-level changes of data.

2. Description of the Related Art

As computers, smart phones, tablets, laptops, servers, and other electronic devices increase in quantity and in performance year to year, the data they generate also increases. Individuals and enterprises back up their local data on their designated server to ensure retrieval of their local data in case the local data is lost on their electronic device. The local data is backed up in case the local data is lost on their electronic device. Conventional methods for data backup are inefficient and waste storage space by storing multiple copies of data on backup servers.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

Figure (FIG. 1 illustrates a backup management environment, in accordance with an embodiment.

DETAILED DESCRIPTION

Figure 1:
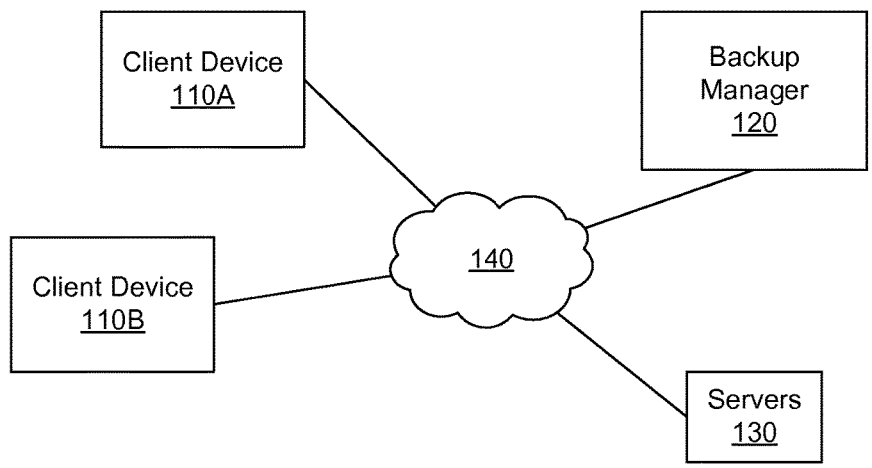

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A system (and a method and a computer-readable storage medium) is configured for efficient deduplication storage and retrieval of files. The system receives the first backup file through a first backup request from a first client device and generates a first index of the first backup file. The system determines whether the first backup file has previously been stored on one or more backup servers based on the generated first index. Responsive to determining the first backup file has not previously been stored on one or more backup servers, the first backup file and the generated first index are sent to a first location on a server of the one or more backup servers. The first index and the first location is stored in association with a client profile of the first client device.

The system can also receive an additional backup file from a second client device, the additional backup file comprising the first backup file and a second backup file. The system determines whether the first backup file has previously been stored on the one or more backup servers. Responsive to determining the first backup file has previously been stored on the one or more backup servers, a second index of the second backup file is generated. Then, the system determines whether the second backup file has previously been stored on the one or more backup servers based on the generated second index. Responsive to determining the second backup file has not previously been stored on one or more backup servers, the second backup file and the generated second index are sent to a second location on a server of the one or more backup servers. The first index, the first location, the second index, and the second location are stored with a client profile of the second client device.

When retrieving a file, the system receives a request to retrieve the first backup file from one or more backup servers from a first client device. A first index for the first backup file is accessed through a client profile of the first client device and a first location associated with the first index is also accessed based on the first index. Then, the first backup file is retrieved from the one or more backup servers based on the first location.

The system can receive another request to retrieve an additional backup file from one or more backup servers from a client device, the additional backup file comprising a first backup file and a second backup file. A first index for the first backup file and a second index for the second backup file are accessed through a client profile of the client device. In addition, a first location associated with the first backup file and a second location associated with the second backup file are accessed based on the first and second indices. The system retrieves the first backup file and the second backup file from the one or more backup servers based on the first and second locations.

System Overview

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

FIG. 1 illustrates one embodiment of a backup management environment 100, which comprises a backup manager 120 that provides data backup services to client devices 110 over a network 140 through one or more servers 130. A plurality of client devices 110, including client devices 110A and 110B, may send a request to store a file, metadata, a version of a file, or other suitable data to the backup manager 120. The client devices 110 can be any computing device that has data that requires backup. Examples of such a device include a personal computer (PC), a desktop computer, a notebook, a tablet PC, or any other suitable electronic device. Examples also include a device executing an operating system, for example, a MICROSOFT WINDOWS—compatible operating system (OS), APPLE OS X, and/or a LINUX distribution. The client devices 110 can also be any device having computer functionality, such as a personal digital assistant (PDA), a mobile telephone, a smartphone, a device executing the APPLE iOS operating system, the ANDROID operating system, WINDOWS MOBILE operating system, or WEBOS operating system. Computer functionality is described further in conjunction with FIG. 6. The client devices 110 may also be a server device that requires backup, such as a web server (running for example APACHE), a file server, a database server, etc. Although such server devices may perform server functions in an organization, from the point of view of the backup manager 120, they are treated like any other client device that requires data backup services.

The backup manager 120 enables the client device 110 to store data, metadata, or any other suitable data for backup on the one or more servers 130 and to download data, metadata, or any other suitable data that has been backed up or stored in the past on the one or more servers 130. The backup manager 120 has the capability to determine one or more backup servers for a client. In addition, the backup manager 120 can determine to which server(s) to back up data or metadata and from which server(s) to retrieve backup data or metadata. The method used by the backup manager 120 efficiently backs up and retrieves data and/or metadata (e.g., file-level changes of data) without duplicating data or metadata on the servers, as further described in conjunction with FIGS. 3, 4, and 5. In one embodiment, the backup manager 120 may be implemented using one or more computer servers that have a network communications capability. In another embodiment, the backup manager 120 is implemented using cloud services such as AMAZON WEB SERVICES or MICROSOFT AZURE.

The interaction between the client devices 110 and the backup manager 120 are typically performed via a network 140, for example, via the internet. The network 140 enables communications between the client device 110 and the backup manager 120. In one embodiment, the network 140 uses standard communications technologies and/or protocols. Thus, the network 140 can include links using technologies such as Ethernet, 802.11, worldwide interoperability for microwave access (WiMAX), long-term evolution (LTE), 4G, 3G, digital subscriber line (DSL), asynchronous transfer mode (ATM), InfiniBand, PCI Express Advanced Switching, etc. Similarly, the networking protocols used on the network 101 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 140 can also include links to other networks such as the Internet.

Figure 2:
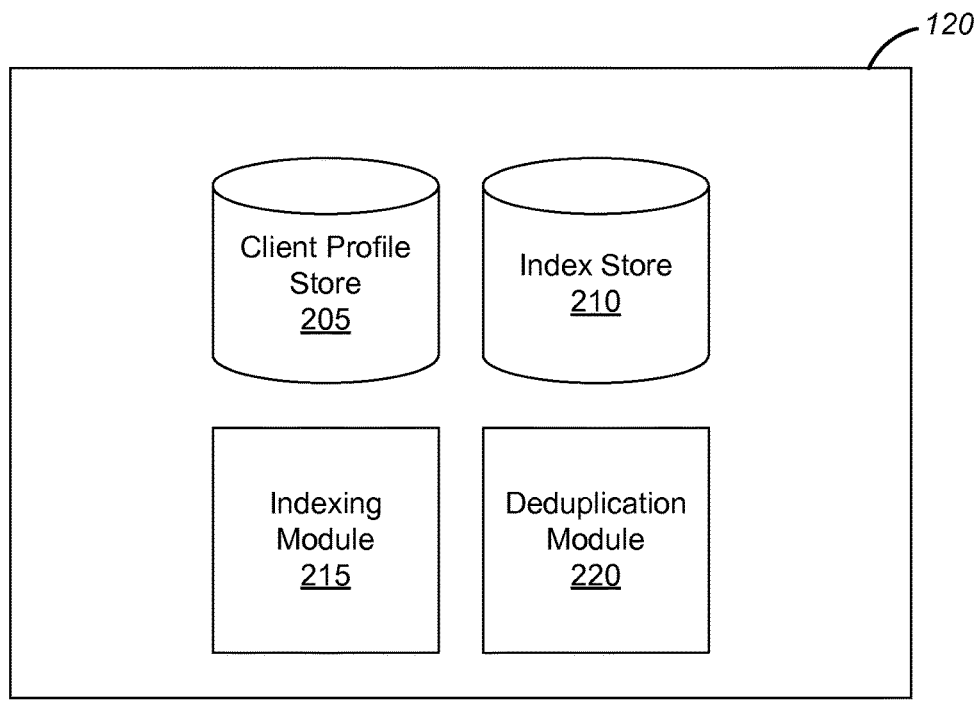
FIG. 2 illustrates a backup manager of the backup environment, in accordance with an embodiment.

FIG. 2 illustrates a block diagram of an embodiment of the backup manager 120. The backup manager 120 includes a client profile store 205, an index store 210, an indexing module 215, and a deduplication module 220. In another embodiment, information stored in the index store 210 can be stored in the client profile store 205. In other embodiments, the backup manager 120 may include additional, fewer, or different components for various applications.

When the backup manager 120 receives a request from a client device 110A to back up a file (e.g., data, metadata, etc.), the backup manager 120 accesses or stores information from a client profile associated with the client device 110A or 110B from the client profile store 205, generates a checksum for the file in the indexing module 215 and stores the file and the generated checksum on one or more of the servers 130. The checksum is stored in the client profile store 205 along with an association to the client profile of the client device 110A or 110B that requested backup of the file and the checksum is stored in the index store 210 with an association to the location of where the file and the checksum were stored on the servers 130.

If the client device 110A or 110B is a new client device, the backup manager 120 can also determine to which server to back up the file. For example, the server can be determined based on the generated checksum by checking if the generated checksum exists in the index store 210. If so, the checksum is stored as an association with a new client profile of the new client device in the client profile store 205.

If the generated checksum does not exist in the index store 210, the deduplication module 220 determines whether a portion (e.g., file-level changes) of the file has previously been stored on the servers 130 based on the generated checksum. If so, the checksum is stored as an association with the new client profile in the client profile store 205 and a new checksum is generated for the portions of the file that have not previously been stored on the servers 130. The portions of the file not previously stored and checksum of the portions are stored on the servers 130. The new checksums are stored in the client profile store 205 along with an association with the new client profile. The generated checksum is stored in the index store 210 with an association to the location of where the portions and the generated checksum were stored on the servers 130.

When the backup manager 120 receives a request from a client device 110A to retrieve a previously backed up file, the backup manager 120 accesses the client profile of the client device (e.g., 110A, 110B) from the client profile store 205, accesses a checksum of the previously backed up file from the client profile, accesses location of where the first backup file and the checksum are stored on the servers 130 from the index store 210, and retrieves the previously backed up file from the one or more servers 130 using the location information. The functions of the backup manager 120 are further described in conjunction with FIGS. 3, 4, and 5.

The client profile store 205 stores client profiles for client devices 110 and previously generated checksums of a previously backed up file in association with the respective client profiles. The index store 210 stores generated checksums of backups and an association of location(s) of the generated checksums with the stored generated checksums.

The indexing module 215 generates a checksum for a file from a backup request of a client device 110. The indexing module 215 can generate a checksum using encryption algorithms including checksum algorithms, hash functions, or any other suitable encryption algorithm. The generated checksums are stored on the servers 130 with the files and also stored in the index store 210 in association with the location of where the files and checksums are stored on the servers 130.

The deduplication module 220 checks the generated checksum of the indexing module 215 and determines whether a portion of the file associated with the generated checksum has previously been stored on the servers 130. For example, based on the algorithm used in the indexing module 215, a deduplication algorithm is used on the generated checksum. If the deduplication algorithm determines that a portion of the file has previously been stored, an additional checksum is generated for the additional portion of the file that has not previously been stored on the servers 130. The additional checksum is stored on the servers 130 along with the additional portion of the file. The location of the portion and additional portion are stored as an association with the checksums associated with the stored portion and additional portion in the index store 210. In addition, the checksums associated with the stored portion and additional portion are also stored in association with the client profile of the client device 110 in the client profile store 205.

Efficient Deduplication Storage of a File

Figure 3:
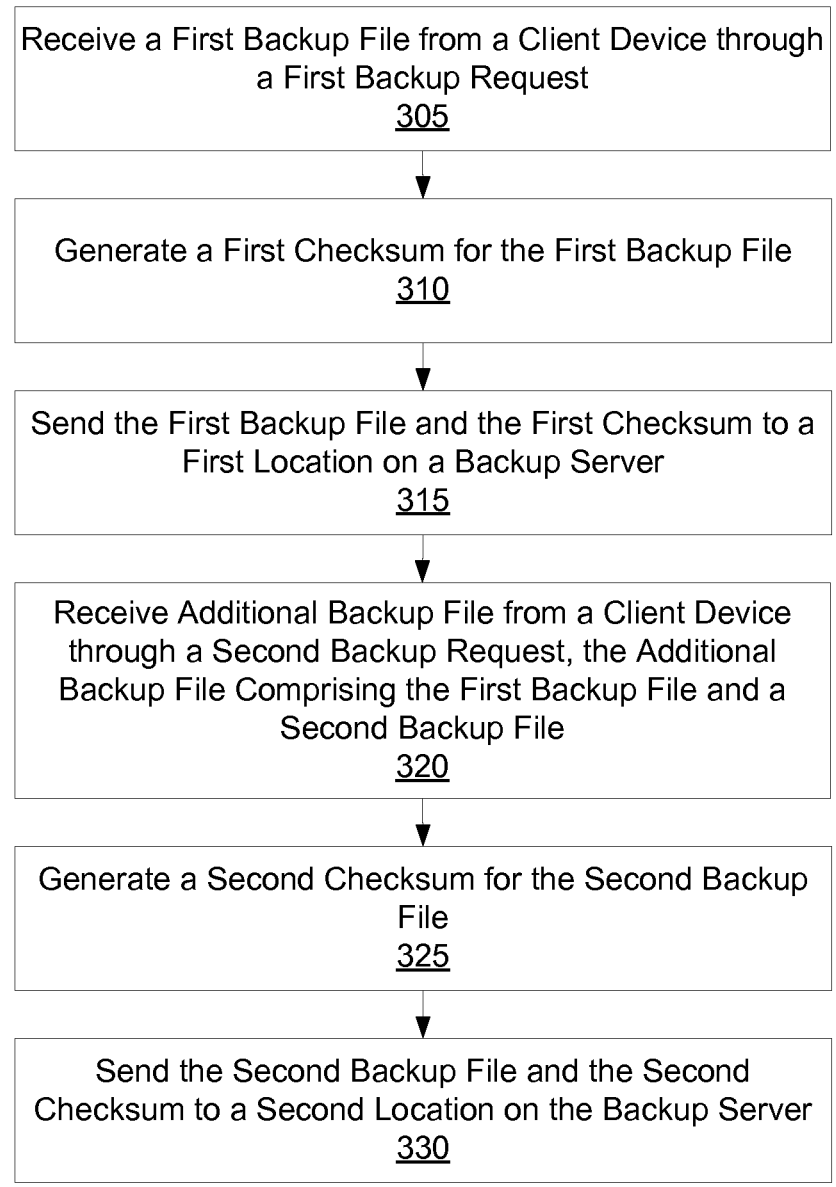
FIG. 3 illustrates a flowchart of a method of backing up data and file-level changes of data through indexing, in accordance with an embodiment.

FIG. 3 illustrates a flowchart of one embodiment of a method for efficient deduplication storage of a file. In other embodiments, the method may include different and/or additional steps than those shown in FIG. 3. The functionality described in conjunction with the backup manager 120 in FIG. 3 may be provided by the indexing module 215 and the deduplication module 220, in one embodiment, or may be provided by any other suitable component, or components, in other embodiments. Additionally, the client device 110 may execute one or more instructions associated with the backup manager 120, such as an application associated with the backup manager 120, to provide the functionality described in conjunction with FIG. 3.

The backup manager 120 receives 305 a first backup file from a client device 110 through a first backup request. For example, the first backup file can be a file shared among multiple client devices 110. In this example, the first backup request is from a first client device, such as client device 110A.

A first checksum is generated 310 for the first backup file. In this example, a checksum is generated but any other suitable encryption algorithm can be used to generate an index for the first backup file. For the purposes of discussion, a first checksum is generated. In one example, the indexing module 215 generates the first checksum. The indexing module 215 determines whether the first backup file has previously been stored on the servers 130 by checking if the first checksum exists, for example, in the index store 210. If the first checksum does exist in the index store 210, the first checksum is stored in association with the client profile of the first client device 110. For purposes of discussion, the first backup file has not previously been stored on the servers 130. The generated checksum is stored in the index store 210 and in the client profile store 205 in association with the client profile of the first client device 110A.

The first backup file and the first checksum are sent 315 to a first location on a backup server for storage. The first location is stored in the index store 210 in association with the first checksum also stored in the index store 210. The first location can also be stored in the client profile store 205 in association with the client profile of the first client device 110A.

The backup manager 120 can also receive 320 an additional backup file from a client device 110 through a second backup request where the additional backup file includes the first backup file and a second backup file. In one embodiment, the client device 110 is the first client device 110A. However, the client device 110 can also be a second client device 110B. For purposes of discussion, the second backup request will be described as a request from a second client device 110B.

In one embodiment, the backup manager 120 generates a checksum for the additional backup file. The deduplication module 220 determines whether the additional backup file comprises a portion previously stored on the servers 130. In this example, the deduplication module 220 determines that the first backup file exists on the servers 130 but the second backup file does not. For example, if the additional backup file is a 10 GB file, it is possible 6 GB of the 10 GB (e.g., the first backup file) already exists on the servers 130. In this case, the deduplication module 220 determines that the 4 GB (e.g., the second backup file) was not stored on the servers 130. A second checksum is generated 325 for the second backup file. In one example, the second checksum is stored in the index store 210 and in the client profile store 205 in association with the client profile of the second client device 110B. In addition, the checksum generated for the additional backup file also is stored in association with the client profile in the client profile store 205. For example, the first checksum and the second checksum can be stored in association with the generated checksum of the additional backup file, indicating that the files associated with the first checksum and the second checksum make up the additional backup file.

The second backup file and the second checksum are sent 330 to a second location on the backup server. The second location is stored in association with the second checksum in the index store 210 and can be stored in association with the client profile of the second client device 110B in the client profile store 205. In addition, the first checksum of the first backup file of the additional backup file is also stored in association with the client profile of the second client device 110B in the client profile store 205. Thus, the second client profile in the client profile store 205 has an association to the first checksum of the first backup file and the second checksum of the second backup file.

Retrieval of a Deduplicated File

Figure 4:
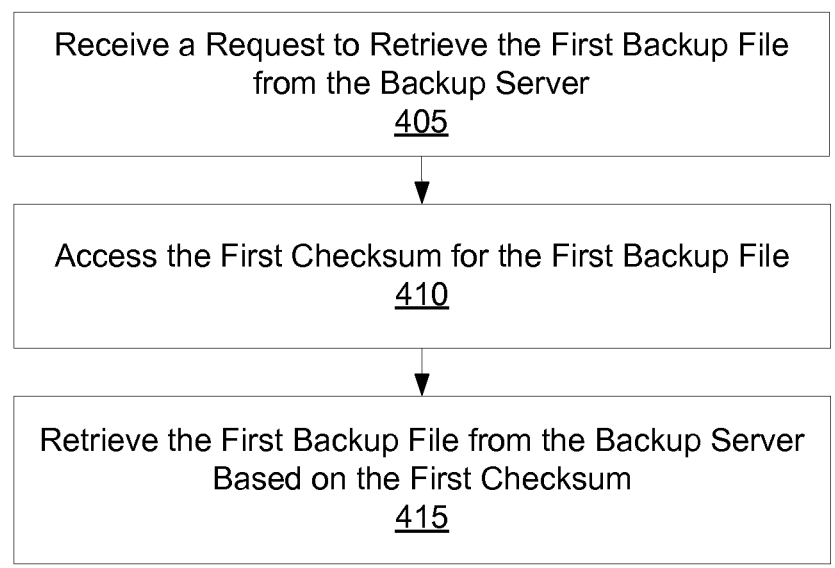
FIG. 4 illustrates a flowchart of a method of retrieving data based on indexing, in accordance with an embodiment.

FIG. 4 illustrates a flowchart of one embodiment of a method for retrieving the first backup file. In other embodiments, the method may include different and/or additional steps than those shown in FIG. 4. The functionality described in conjunction with the backup manager 120 in FIG. 4 may be provided by the indexing module 215 and the deduplication module 220, in one embodiment, or may be provided by any other suitable component, or components, in other embodiments. Additionally, the client device 110 may execute one or more instructions associated with the backup manager 120, such as an application associated with the backup manager 120, to provide the functionality described in conjunction with FIG. 4.

The backup manager 120 receives 405 a request to retrieve the first backup file from the backup servers 130.

The first backup file, as described in the embodiment of FIG. 3, is stored on the servers 130 and associated with a first location. A checksum is accessed 410 for the first backup file. In the embodiment, the first backup file, as described in the embodiment of FIG. 3, is stored on the servers 130. Thus the accessed checksum is the same as the first checksum generated in the embodiment of FIG. 3 and exists in the index store 210. The backup manager 120 retrieves 415 the first backup file based on the first location stored in association with the first checksum in the index store 210 from the backup servers 130.

Figure 5:
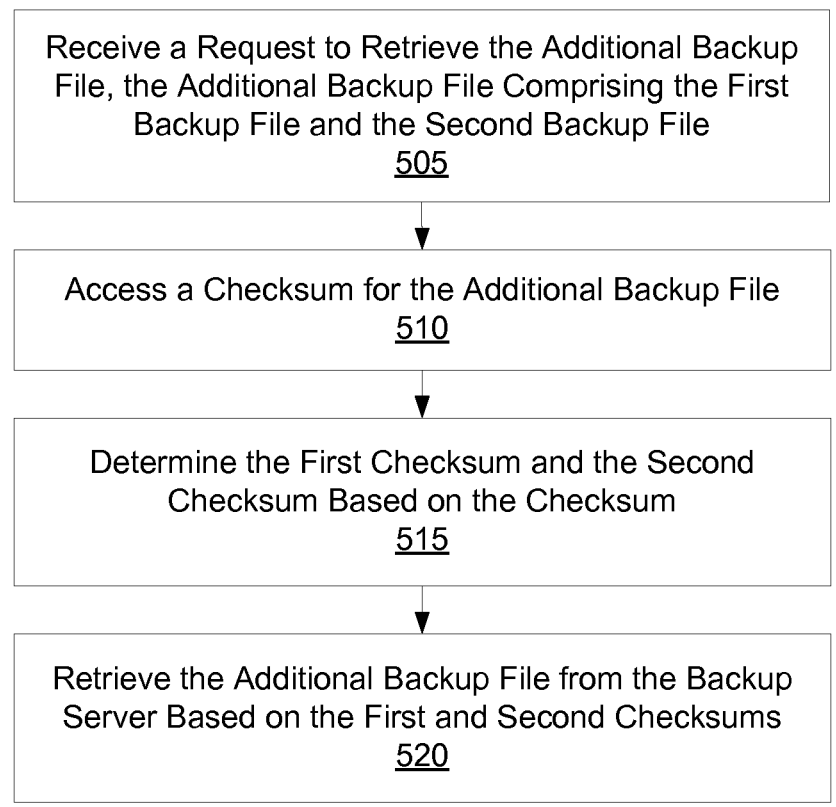
FIG. 5 illustrates a flowchart of a method of retrieving file-level changes of data based on indexing, in accordance with an embodiment.

FIG. 5 illustrates a flowchart of one embodiment of a method for retrieving the additional backup file including the first backup file and the second backup file. In other embodiments, the method may include different and/or additional steps than those shown in FIG. 5. The functionality described in conjunction with the backup manager 120 in FIG. 5 may be provided by the indexing module 215 and the deduplication module 220, in one embodiment, or may be provided by any other suitable component, or components, in other embodiments. Additionally, the client device 110 may execute one or more instructions associated with the backup manager 120, such as an application associated with the backup manager 120, to provide the functionality described in conjunction with FIG. 5.

The backup manager 120 receives 505 a request to retrieve the additional backup file which, as described in the embodiment of FIG. 3, is stored on the servers 130. The additional backup file includes both the first backup file and the second backup file. A checksum is accessed 510 for the additional backup file. In the embodiment where the checksum of the additional backup file was stored in the client profile store 205, the additional backup file is accessed and retrieved from the servers 130 based on the first checksum and the second checksum stored in association with the accessed checksum of the additional backup file in the client profile store 205.

In the embodiment where the checksum of the additional backup file is not stored and the first checksum and the second checksum are stored instead, the deduplication module 220 of the backup manager 120 determines whether a portion of the additional backup file already exists on the servers 130 based on the accessed checksum of the additional backup file. In this embodiment, the deduplication module 220 determines 515 the first checksum and the second checksum based on the generated checksum and the backup manager 120 retrieves 520 the additional backup from the backup servers 130 based on the first and second checksums. For example, the backup manager 120 accesses the first backup file based on the location stored in the index store 210 associated with the first checksum and accesses the second backup file based on the location stored in the index store 210 associated with the second checksum.

Computing Machine Architecture

Figure 6:
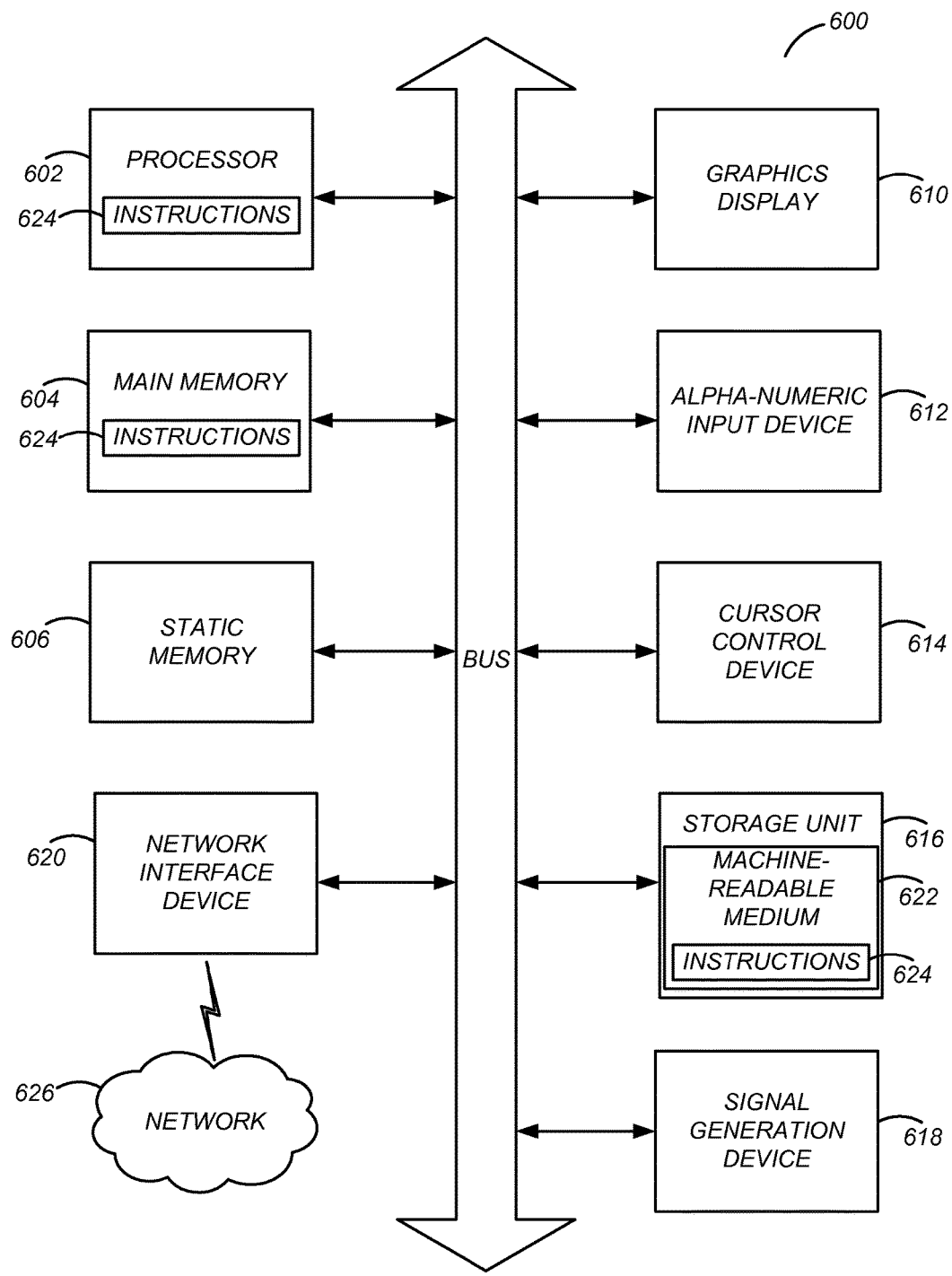
FIG. 6 illustrates components of an example machine able to read instructions from a machine-readable medium and execute them in a processor (or controller), in accordance with an embodiment.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which instructions 624 (e.g., software, program code, or computer program product) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 120.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Benefits of the system, method, and computer readable storage medium disclosed herein include a more efficient and less time consuming backup process for client devices. Specifically, just new data and changes of or metadata of previously backed up data are stored on the backup servers. The disclosed herein stores new data or changes to previously stored data using indices and the indices allow for quick retrieval of backed up data. Thus, space on the backup servers is not wasted by storing multiple copies of a file and reconstruction of previously backed up data during data retrieval is quick because of the indices.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for efficient deduplication storage and retrieval of files through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for deduplication storage in one or more cloud backup servers, the method comprising:
   receiving a first backup file through a first backup request from a first client device of a first client;
   generating a first index of the first backup file;
   storing the first index in a first client profile associated with the first client;
   storing the first backup file uploaded by the first client in the one of the cloud backup servers;
   receiving an additional backup file from a second client device of a second client, the additional backup file comprising the first backup file and a second backup file;
   generating a second index of the second backup file and an additional index of the additional backup file, the additional index being a checksum of the entire additional backup file;
   storing, responsive to the additional backup file comprising the first backup file, only the second backup file in one of the cloud backup servers; and
   storing the first index, the second index, and the additional index in a second client profile associated with the second client, the first backup file uploaded by the first client accessible by the second client.

2. The method of claim 1, further comprising:
   determining whether the second backup file has previously been stored on the one or more backup servers based on the generated second index; and
   wherein, storing the second backup file in one of the cloud backup servers comprises, responsive to determining the second backup file has not previously been stored on the one or more backup servers, sending the second backup file and the generated second index to a second location on a server of the one or more backup servers.

3. The method of claim 1, wherein the generated first index is one of a checksum or a hash.

4. The method of claim 1, wherein the generated second index is one of a checksum or a hash.

5. A non-transitory computer readable storage medium comprising instructions, when executed by at least one processor, cause the at least one the processor to:
   receive a first backup file through a first backup request from a first client device of a first client;
   generate a first index of the first backup file;
   store the first index in a first client profile associated with the first client;
   store the first backup file uploaded by the first client in one of the cloud backup servers;
   receive an additional backup file from a second client device of a second client, the additional backup file comprising the first backup file and a second backup file;
   generate a second index of the second backup file and an additional index of the additional backup file, the additional index being a checksum of the entire additional backup file;
   store, responsive to the additional backup file comprising the first backup file, only the second backup file in the one of the cloud backup servers; and
   store the first index, the second index, and the additional index in a second client profile associated with the second client, the first backup file uploaded by the first client accessible by the second client.

6. The computer readable storage medium of claim 5, further comprising instructions that when executed cause the at least one processor to:
   determine whether the second backup file has previously been stored on the one or more backup servers based on the generated second index; and
   wherein the instruction that causes the at least one processor to store the second backup file in the one of the cloud backup servers comprises an instruction to cause the at least one processor to transmit, responsive to determining the second backup file has not previously been stored on the one or more backup servers, the second backup file and the generated second index to a second location on a server of the one or more backup servers.

7. The method of claim 1, further comprising:
   responsive to receiving the first backup file through the first backup request, determining whether the first backup file has previously been stored based on the first index generated.

8. The method of claim 1, wherein storing the second backup file in the one of the cloud backup servers comprises storing the second backup file at a location of the one of the cloud backup servers along with the second index.

9. The method of claim 8, further comprising associating, in an index store, the second index with a location data of the location that stores the second backup file.

10. The method of claim 1, further comprising:
    receiving a request to retrieve the additional backup file;
    accessing the second client profile to locate the additional index;
    determining that the additional index is associated with the first index and the second index; and
    retrieving the first backup file and the second backup file based on the first index and the second index.

11. The computer readable storage medium of claim 5, further comprising instructions that when executed cause the processor to:
    responsive to receiving the first backup file through the first backup request, determine whether the first backup file has previously been stored based on the first index generated.

12. The computer readable storage medium of claim 5, wherein the instruction to cause the at least one processor to store the second backup file in the one of the cloud backup servers comprises an instruction that when executed by the at least one processor, causes the at least one processor to store the second backup file at a location of the one of the cloud backup servers along with the second index.

13. The computer readable storage medium of claim 12, further comprising instructions that when executed cause the at least one processor to associate, in an index store, the second index with a location data of the location that stores the second backup file.

14. The computer readable storage medium of claim 5, further comprising instructions that when executed cause at least one the processor to:
receive a request to retrieve the additional backup file;
access the second client profile to locate the additional index;
determine that the additional index is associated with the first index and the second index; and
retrieve the first backup file and the second backup file based on the first index and the second index.

15. A system comprising:
one or more cloud backup servers configured to store data; and
a backup manager configured to:
receive a first backup file through a first backup request from a first client device of a first client;
generate a first index of the first backup file;
store the first index in a first client profile associated with the first client;
store the first backup file uploaded by the first client the one of the cloud backup servers;
receive an additional backup file from a second client device of a second client, the additional backup file comprising the first backup file and a second backup file;
generate a second index of the second backup file and an additional index of the additional backup file, the additional index being a checksum of the entire additional backup file;
store, responsive to the additional backup file comprising the first backup file, only the second backup file in the one of the cloud backup servers; and
store the first index, the second index, and the additional index in a second client profile associated with the second client, the first backup file uploaded by the first client accessible by the second client.

16. The system of claim 15, wherein the generated first index is one of a checksum or a hash.

17. The system of claim 15, wherein the generated second index is one of a checksum or a hash.

18. The system of claim 15, wherein storing the second backup file in one of the cloud backup servers further comprises storing the second backup file at a location of the one or more cloud backup servers along with the second index.

19. The system of claim 15, wherein the backup manager is further configured to associated, in an index store, the second index with a location data of the location that stores the second backup file.

20. The system of claim 15, wherein the backup manager is further configured to:
receive a request to retrieve the additional backup file;
access the second client profile to locate the additional index;
determine that the additional index is associated with the first index and the second index; and
retrieve the first backup file and the second backup file based on the first index and the second index.

* * * * *

UNITED STATES PATENT AND TRADEMARK OFFICE
CERTIFICATE OF CORRECTION

PATENT NO. : 10,387,378 B2
APPLICATION NO. : 14/791038
DATED : August 20, 2019
INVENTOR(S) : Nikhil Singhal et al.

Page 1 of 1

It is certified that error appears in the above-identified patent and that said Letters Patent is hereby corrected as shown below:

In the Claims

Column 11, Claim 5, Line 62, delete "at least one the processor to:" and insert --at least one processor to:--

Column 13, Claim 14, Lines 7-8, delete "that when executed cause at least one the processor to:" and insert --that when executed cause the at least one processor to:--

Column 13, Claim 15, Line 24, delete "uploaded by the first client the" and insert --uploaded by the first client in the--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*